United States Patent
Marupaduga

(10) Patent No.: US 11,757,563 B1
(45) Date of Patent: Sep. 12, 2023

(54) SUPPRESSION OF MCS IN RESPONSE TO BACKHAUL CONSTRAINT

(71) Applicant: Sprint Spectrum L.P., Overland Park, KS (US)

(72) Inventor: Sreekar Marupaduga, Overland Park, KS (US)

(73) Assignee: Sprint Spectum LLC, Bellevue, WA (US)

( * ) Notice: Subject to any disclaimer, the term of this patent is extended or adjusted under 35 U.S.C. 154(b) by 245 days.

(21) Appl. No.: 16/863,256

(22) Filed: Apr. 30, 2020

(51) Int. Cl.
*H04W 28/02* (2009.01)
*H04L 1/00* (2006.01)
*H04W 88/14* (2009.01)
*H04W 92/10* (2009.01)

(52) U.S. Cl.
CPC ....... *H04L 1/0005* (2013.01); *H04W 28/0284* (2013.01); *H04W 88/14* (2013.01); *H04W 92/10* (2013.01)

(58) Field of Classification Search
None
See application file for complete search history.

(56) References Cited

U.S. PATENT DOCUMENTS

| 10,383,147 B2 | 8/2019 | Rajagopal et al. |
| 2017/0318604 A1 | 11/2017 | Liu et al. |
| 2018/0054757 A1* | 2/2018 | Nanri .................... H04L 1/00 |
| 2020/0252847 A1* | 8/2020 | Park .................... H04W 36/08 |

FOREIGN PATENT DOCUMENTS

WO    WO 2017/097349    6/2017

* cited by examiner

*Primary Examiner* — Kouroush Mohebbi
(74) *Attorney, Agent, or Firm* — McDonnell Boehnen Hulbert & Berghoff LLP

(57) ABSTRACT

A method and system to control modulation and coding scheme (MCS) used for air-interface communication over an air interface between an access node and one or more user equipment devices (UEs) served by the access node. A method includes detecting that a backhaul connection through which the access node communicates is threshold heavily loaded, and, in response, suppressing the MCS used for air-interface communication over the air interface between the access node and one or more UEs served by the access node. Further, the method could apply in a scenario where multiple access nodes share the backhaul connection, in which case one access node could detect that the backhaul connection is threshold heavily loaded and could responsively cause another access node to suppress MCS used for the other access node's air-interface communication.

17 Claims, 4 Drawing Sheets

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Fig. 2

SUPPRESSION OF MCS IN RESPONSE TO BACKHAUL CONSTRAINT

BACKGROUND

A cellular wireless network typically includes a number of access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide a respective cell defined on a radio-frequency (RF) carrier, which could be frequency division duplex (FDD), with separate frequency channels for downlink and uplink communication, or time division duplex (TDD), with a single frequency channel multiplexed over time between downlink and uplink use. Each such frequency channel could be characterized by a center frequency and particular bandwidth (width of frequency) centered on that center frequency and thus ranging from a low-end frequency to a high-end frequency.

On the downlink and uplink channels, the air interface of each such cell could be configured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each spanning a respective symbol time segment and occupying a particular subcarrier, and the subcarrier of each resource element could be modulated to carry data. Further, in each subframe or other transmission time interval (TTI), the resource elements on the downlink and uplink of the example air interface could be grouped to define physical resource blocks (PRBs) that could be allocated as needed to carry data between the access node and served UEs.

Depending on the carrier bandwidth and configuration of these PRBs, each subframe might thereby define a certain number of these PRBs. For instance, in a representative arrangement, a channel bandwidth of 100 Megahertz (MHz) might define 50 PRBs per subframe, and a channel bandwidth of 20 MHz might define 100 PRBs per subframe.

In addition, certain resources on the downlink and/or uplink of each such cell could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

OVERVIEW

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling, via the access node, with a core-network controller to attach and thus register for service, and the core-network controller and access node could coordinate setup for the UE of one or more user-plane bearers, each including an access-bearer that extends between the access node and a core-network gateway system providing connectivity with a transport network and each including a data-radio-bearer (DRB) that extends over the air between the access node and the UE.

Once the UE is connected and attached, the access node could then serve the UE with packet-data communications.

For instance, when the core-network gateway system receives packet data for transmission to the UE, the data could flow over the UE's access bearer to the access node, and the access node could buffer the data, pending transmission of the data over the UE's DRB to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs. Further, to facilitate this downlink communication, the UE could regularly monitor every downlink subframe for the presence of any such scheduling directive to the UE. And upon detecting and reading the scheduling directive, the UE could then read the transmitted data from the indicated PRBs.

Likewise, on the uplink, when the UE has packet data for transmission on the transport network, the UE could buffer the data, pending transmission of the data over the UE's DRB to the access node, and the UE could transmit to the access node a scheduling request that carries a buffer status report (BSR) indicating the quantity of data that the UE has buffered for transmission. With the example air-interface configuration, the access node could then allocate uplink PRBs in an upcoming subframe to carry at least some of the data from the UE and could transmit to the UE a scheduling directive indicating those upcoming PRBs. Similarly here, the UE could monitor each downlink subframe for the presence of such a scheduling directive. And upon detecting and reading the scheduling directive, the UE could accordingly transmit the data to the access node in the indicated PRBs.

For such scheduled downlink or uplink communication on PRBs, the access node and UE could use a modulation and coding scheme (MCS) that is selected based on the UE's wireless channel quality and that the access node specifies in its scheduling directive to the UE. In a representative implementation, the MCS could define a coding rate based on the extent of error-correction coding data or the like that would be transmitted together with the user-plane data being communicated, and a modulation scheme that establishes how many bits of data could be carried by each resource element. When channel quality is better, the access node may direct use of a higher-order MCS that has a higher coding rate (e.g., with less error-correction coding) and/or that supports more bits per resource element, and when channel quality is worse, the access node may direct use of a lower-order MCS that may have a lower coding rate (e.g., with more error-correction coding) and/or that supports fewer bits per resource element.

To enable the access node to determine what MCS the access node should designate in its scheduling directive to the UE, the UE could regularly monitor channel quality and provide the access node with channel quality reports, and the access node could have a standard mapping table that maps varying levels of channel quality to various different MCSs. Thus, when the access node is going to schedule air-interface communication with the UE, the access node could refer to the UE's latest channel quality report and determine based on the mapping table what MCS to specify. The access node could then accordingly schedule the communication, directing use of the determined MCS.

One technical problem that could arise in such a system is that the backhaul connection through which the access node communicates on the core network can become threshold heavily loaded, to a point where the backhaul connection becomes a bottleneck for data communication, possibly resulting in data loss and/or other issues. This bottleneck problem could arise if the backhaul connection has limited physical or configured throughput that is impractically low. Further, the bottleneck problem could be especially troubling in a situation where the backhaul connection is shared by multiple access nodes that communicate on the core network through a common cell-site router or the like. Unfortunately, backhaul problem could result in loss of both user-plane and control-plane data, among other issues.

The present disclosure provides a mechanism to help address this problem. In accordance with the disclosure, when an access node learns that it's backhaul connection is threshold heavily loaded, the access node will take action to suppress the MCS used for air-interface communication of data that may flow through that backhaul connection. This could include suppressing the MCS used for air-interface communications served by the access node and/or suppressing the MCS used for air-interface communications served by another access node that shares use of the backhaul connection. And suppressing the MCS could involve reducing a maximum MCS that would be allowed for such communication and/or could involve artificially reducing the MCS order used for communication with a given UE to an order lower than the UE's reported channel quality would normally map, among other possibilities.

Suppressing the MCS used for air-interface communication of data that would flow through the backhaul connection could help to limit the effective rate of data flow through the backhaul connection. For instance, a lower MCS for air-interface communication could mean that a greater portion of the information communicated over the air is error-correction coding and a lesser portion of the information communicated over the air is the underlying data that would also flow through the backhaul connection. Further, a lower MCS could involve use of a lower-order modulation scheme with less information carried per resource element, thus also resulting in lower data flow through the backhaul connection.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

BRIEF DESCRIPTION OF THE DRAWINGS

FIG. 2 is an example of a table mapping CQI to MCS.

DETAILED DESCRIPTION

An example implementation will now be described in the context of a system having a cell site that includes multiple access nodes sharing a common cell-site router for communicating on a core network. In particular, the disclosure will address a system where such a cell site includes both a 4G LTE access node (4G evolved Node-B (eNB)) and a 5G NR access node (5G next generation Node-B (gNB)). It should be understood, however, that the principles disclosed herein could extend to apply with respect to other scenarios as well, such as with respect to other RATs and other cell site configurations, including a cell site with just a single access node. Further, it should be understood that other variations from the specific arrangements and processes described are possible. For instance, various described entities, connections, functions, and other elements could be added, omitted, distributed, re-located, re-ordered, combined, or changed in other ways.

Figure 1:
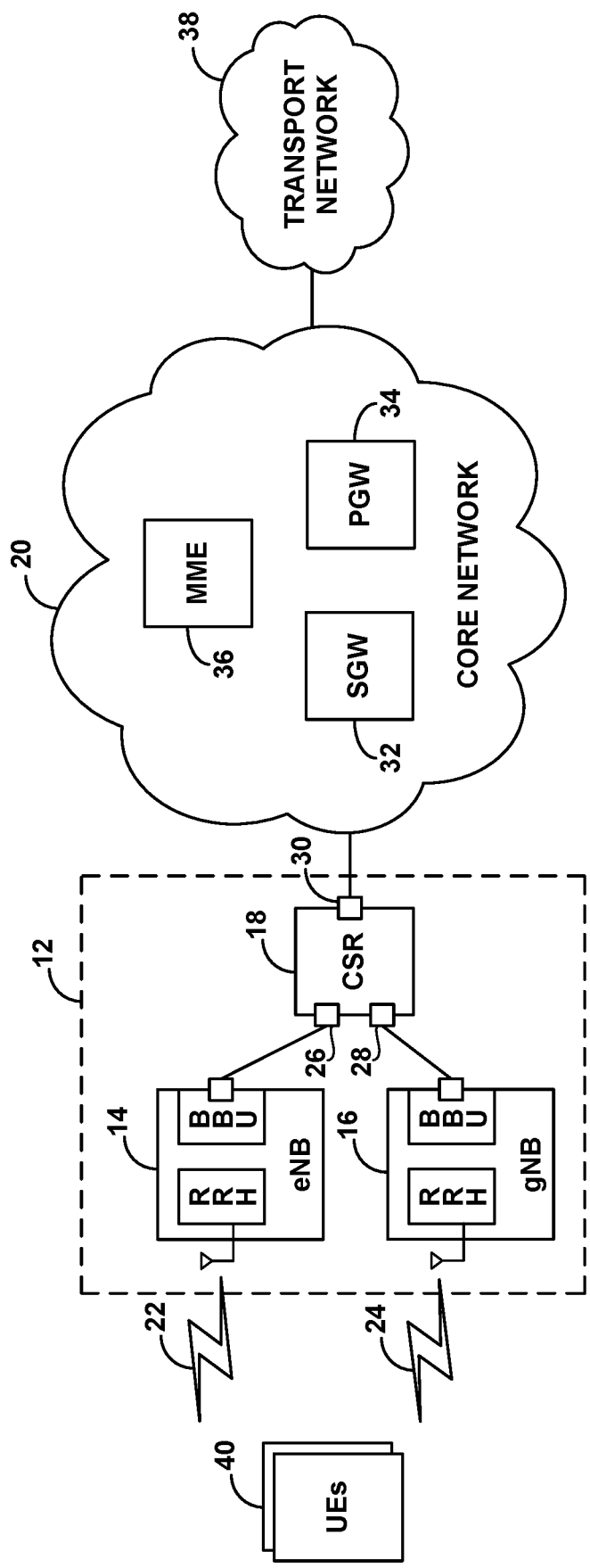
FIG. 1 is a simplified block diagram of an example network arrangement in which aspects of the present disclosure can be implemented.

FIG. 1 is a simplified block diagram depicting a representative arrangement including a cell site 12 having a 4G eNB 14 and a 5G gNB 16, and having a cell site router (CSR) 18 that provides backhaul connectivity between the example access nodes 14, 16 and a core network 20.

Access nodes 14, 16 could each be a macro access node of the type configured to provide a wide range of coverage or could take other forms, such as a small cell access node, repeater, a femtocell access node, or the like, possibly configured to provide a smaller range of coverage. Further, the two access nodes might provide coverage in largely the same direction as each other, to define an area in which UEs can engage in both 4G service provided by the 4G eNB 14 and 5G service provided by the 5G gNB 16.

Each access node could be configured to provide coverage and service on a respective carrier. Namely, the 4G eNB 14 could provide coverage and service on a 4G carrier 22, and the 5G gNB 16 could provide coverage and service on a 5G carrier 24. In representative 4G and 5G implementations, each such carrier could be FDD or TDD and could thus define separate downlink and uplink frequency channels or a single frequency channel multiplexed over time between downlink and uplink use. And as noted above, each such frequency channel could be characterized by its center frequency and bandwidth.

Further, the air interface on each carrier could be structured as described above by way of example, being divided over time into frames, subframes, timeslots, and symbol time segments, and over frequency into subcarriers, thus defining the array of air-interface resource elements grouped into PRBs allocable by the access node as noted above, for use to carry data to or from served UEs. 4G and 5G air-interfaces, however, might differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In an example implementation as shown in FIG. 1, each of the access nodes 14, 16 could include an antenna structure, a remote radio head (RRH), and a baseband unit (BBU). For example, the cell site 12 could include a massive-MIMO antenna array shared by the access nodes, or each access node could have its own respective antenna array. Each access node's RRH could then include a radio and other RF circuitry defining an RF transmit chain and an RF receive chain, with components such as power amplifiers, filters, and digital-analog converters, to facilitate RF communication via the access node's antenna structure. And each access node's BBU could include processing components to facilitate baseband signal processing, general access node control, and backhaul communication.

In a representative arrangement, for instance, the example cell site 12 could include an antenna tower and an equipment room or cabinet at the base of the antenna tower. Each access node's antenna structure and RRH could be mounted on the tower. And each access node's BBU could be housed in the equipment room or cabinet and connected with the access node's RRH by a multi-fiber cable.

Further, the equipment room or cabinet could also house the cell site's CSR 18, which as noted above could provide connectivity with the core network 20. The CSR 18 could be a network router, configured to forward data packets from point to point, here between the cell site 12 and entities on the core network 20, among other possibilities. As such, the CSR 18 could include multiple ports supporting physical and logical network connections with other devices. As shown in FIG. 1, for instance, at least one port 26 of the CSR 18 could be connected by a network cable with the BBU of the 4G eNB 14, at least another port 28 of the CSR 18 could be connected by a network cable with the BBU of the 5G gNB 16, and at least another port 30 of the CSR 18 could be connected by a network cable with the core network 20 (e.g., with a neighboring router, switch, or gateway of the core network 20).

Core network 20 could be a packet-switched network, such as an Evolved Packet Core (EPC) network or Next Generation Core (NGC) network, supporting Internet Protocol (IP) communication and virtual packet tunnel interfaces between network nodes. In the example shown, the core network 20 includes a serving gateway (SGW) 32, a packet data network gateway (PGW) 34, and a mobility management entity (MME) 36, although other arrangements are possible as well.

With this arrangement, each access node's BBU could sit as a node on the core network 20, having an assigned IP address through the BBU's connection with the CSR 18. Each access node could then communicate with the SGW 32, the SGW 32 could communicate with the PGW 34, and the PGW 34 could provide connectivity with a transport network 38, such as the Internet. Further, each access node could communicate with the MME 36, and the MME 36 could communicate with the SGW 32, so that the MME 36 could coordinate setup of bearers for UEs to engage in packet-data communication.

FIG. 1 also depicts various example UEs 40 that may from time to time be within coverage of cell site 12 and may be served by either or both of the illustrated access nodes. Each such UE might be configured to support 4G service and/or 5G service. For instance, a UE may have a 4G LTE radio and associated RF circuitry and logic and/or a 5G NR radio and associated RF circuitry and logic. In addition, if a UE is configured to support both 4G service and 5G service, the UE might also be configured to support dual 4G-5G connectivity, such as EUTRA-NR Dual Connectivity (EN-DC) for instance.

Upon entering into coverage of cell site 12, a representative UE 40 could initially scan for coverage on a preferred RAT, such as 4G or 5G, and the UE could thereby discover threshold strong coverage of one of the access nodes. The UE could then engage in RRC signaling with that access node to establish a connection under the applicable RAT. And if appropriate, the UE could engage in attach signaling with the MME 36 through the UE's established RRC connection, and the MME 36 could coordinate setup for the UE of at least one user-plane bearer. For instance, the MME 36 could engage in signaling with the access node and the SGW 32 to coordinate setup for the UE of an S1-U packet tunnel between the access node and the SGW 32, the SGW 32 could responsively engage in signaling with the PGW 34 to set up for the UE a corresponding S5 packet tunnel between the SGW 32 and the PGW 34, and the access node could also responsively engage in signaling with the UE to set up a corresponding data radio bearer (DRB) over the air between the access node and the UE.

Once the UE is so connected and attached, the core network and access node could then serve the UE with packet-data communication in the manner described above.

In particular, when the SGW 32 has data for transmission to the UE, that data could flow over the UE's S1-U tunnel and via the CSR 18 to the access node's BBU, which could buffer the data pending transmission. The BBU could then apply a scheduling algorithm to allocate downlink PRBs in a upcoming subframe for carrying at least a portion of the buffered data over the air to the UE. And the BBU could then transmit to the UE a Downlink Control Information (DCI) message specifying the allocated PRBs and could provide the data to the access node's RRH with a directive that causes the RRH to transmit the data over the air to the UE in the allocated PRBs.

And when the UE has data buffered for uplink transmission and has sent a scheduling request to the access node, the access node could likewise apply a scheduling algorithm to allocate uplink PRBs in an upcoming subframe for carrying at least a portion of the buffered data over the air from the UE. The BBU could then transmit to the UE a DCI message specifying the allocated PRBs, and the UE could accordingly transmit the data over the air in the allocated PRBs. Upon receipt of that transmission at the access node, the access node's RRH could then forward the data to the BBU, and the BBU could in turn forward the data over the UE's S1-U tunnel and via the CSR 18 to the SGW 32.

As noted above, the air-interface communication of this data between the access node and the UE could be conducted using an MCS selected based on the UE's channel quality. And selection of this MCS could be coordinated by the access node's BBU, based on channel-quality reporting from the UE, among possibly other factors.

As indicated above, the MCS selected for use in a given instance could define a coding rate and a modulation scheme. The coding rate could define a rate of usable data communication, taking into account any error-correction coding added to help overcome errors in transmission (with more added error correction coding corresponding with a lower effective data rate). And the modulation scheme could define how data will be modulated for transmission over the air, including how many bits of a coded data stream (including any added error-correction bits) can be modulated on the subcarrier of each air-interface resource element. Examples of modulation schemes include, without limitation, (i) Quadrature Phase Shift Keying (QPSK), which represents 2 bits per resource element, (ii) 8PSK, which represents 3 bits per resource element, (iii) 16 Quadrature Amplitude Modulation (16QAM), which represents 4 bits per resource element, and (iv) 64QAM, which represents 6 bits per resource element.

In general, a lower-order MCS, using a lower coding rate (e.g., with more error-correction data) and/or a modulation scheme in which each air-interface resource element represents fewer bits, may be more robust and error-tolerant and thus more suitable when the UE's channel conditions are poor. Whereas, a higher-order MCS, using a higher coding rate (e.g., with less error-correction data) and/or a modulation scheme in which each air-interface resource element represent a greater number of bits, may be less robust but may provide higher throughput and may thus be more suitable when the UE's channel conditions are good.

To facilitate the BBU's selection of an MCS to be used for air-interface communication with the UE, the UE could regularly evaluate the quality of its air interface communication channel with the access node, which could be based on measurement of the UE's coverage quality (e.g., signal-to-interference-plus-noise ratio (SINR)) and the UE capabilities (e.g., antenna and/or radio configuration), and the UE could periodically transmit to the access node a channel-quality-indicator (CQI) value that represents the UE's determined level of channel quality. When the BBU is going to allocate one or more PRBs for use to carry data to or from the UE, the BBU could then map the UE's most recent reported CQI to an applicable MCS to be used for communication of data in those PRBs. And the BBU could specify this MCS in the DCI message that the access node sends to the UE, to inform the UE what MCS will be used for the scheduled data communication.

In practice, the BBU could maintain or otherwise have access to a table that maps CQI values with MCSs, ranging from a lowest CQI value correlated with a lowest-order MCS to a highest CQI value correlated with a highest-order MCS. FIG. 2 depicts a standard example of such a CQI-MCS table, showing CQI indexes ranging from 1 up to 15 and MCSs correspondingly ranging from QPSK with a coding rate of 78/1024 up to a 64QAM with a coding rate of 948/1024. In this table, each MCS is thus a combination of modulation type (e.g., ranging from a lowest-order modulation scheme of QPSK to a highest order modulation scheme of 64-QAM) and coding rate (e.g., ranging from 78/1024 to 948/1024), though in other examples the MCS could simply be the modulation type or could take still other forms.

Applying this table, the BBU could select an MCS to be used for a next scheduled communication with a UE, with the selection being based on the latest CQI that the access node received from the UE. For example, if the latest CQI that the access node received from the UE was CQI 5, then the BBU could determine that the MCS should be QPSK at a coding rate of 602/1024, so the BBU could specify this MCS in the DCI message that the BBU sends to the UE, and communication could proceed accordingly. Whereas if the latest CQI that the access node received from the UE was CQI 9, then the BBU could determine that the MCS should be 16-QAM at a coding rate of 616/1024, so the BBU could thus specify this MCS in the DCI message that the BBU sends to the UE, and communication could proceed accordingly.

For downlink communication according to a selected MCS having a respective coding rate and modulation scheme, the BBU could encode the data at the respective coding rate to produce a digital bit stream that includes both the data and error-correction bits. And the BBU or RRH could apply constellation coding according to the respective modulation scheme to produce complex symbols (e.g., I and Q samples) that represent the bits of that stream. The RRH could then modulate those complex symbols onto subcarriers of the access node's carrier and transmit the modulated RF carrier to the antenna structure for over-the-air transmission.

And for uplink communication according a selected MCS, a modulated RF carrier received by the antenna structure could pass to the RRH, and the RRH could demodulate the carrier to obtain complex symbols. Based on the modulation scheme used, the RRH or BBU could then translate those complex symbols into bits of an encoded digital bit stream. And the BBU could then decode that bit stream to obtain the underlying data.

As noted above, a technical problem that could arise with an example system is that an access node's backhaul connection could become overly congested to the point that the backhaul connection becomes a bottleneck for data communication.

In the example arrangement of FIG. 1, for instance, this bottleneck problem as to a given access node could occur at or in relation to the CSR 18, as the CSR 18 provides the access node with backhaul connectivity. For instance, as to the 4G eNB 14, the bottleneck problem might occur at port 26 of the CSR 18 and/or at port 30 of the CSR 18, among other possibilities. And as to the 5G gNB 16, the bottleneck problem might occur at port 28 of the CSR 18 and/or likewise at port 30 of the CSR 18, among other possibilities.

In general, if the rate of data flow to such a backhaul connection point is too high, as where the data flow exceeds the physical or configured capacity of the backhaul connection point for instance, there could be a data backlog, which could result in latency and data loss issues.

As further noted above, the present disclosure provides for addressing this or related issues by detecting that an access node's backhaul connection is threshold heavily loaded and, in response, taking action to suppress the MCS used for air-interface communication of data that would flow through that backhaul connection.

As indicated above, suppressing the MCS used for such air-interface communication could involve reducing a maximum MCS that would be allowed for such communication and/or by reducing the MCS used for communication with a given UE to an order lower than the UE's reported channel quality would normally map, among other possibilities.

By way of example, if the access node is provisioned with the CQI-MCS mapping table as shown in FIG. 2 that maps QCI indexes 1 to 15 to MCSs from QPSK with a coding rate of 78/1024 up to a 64QAM with a coding rate of 948/1024, suppressing the MCS used for communication on the access node's air interface could involve capping the MCS at 64QAM with a coding rate of 466/1024, so that any reported CQI of index 10 or higher would map to that coding rate, thus preventing use of a coding rate higher than that. Alternatively or additionally, suppressing the MCS used for such air-interface communication could involve shifting the QCI-MCS mappings so that each CQI index maps to the MCS that is one or more orders lower than what the table maps with the CQI index.

Suppressing the MCS used for air-interface communication may thus result in the access node designating in its DCI message to a UE an MCS that is lower order than the access node would otherwise designate. And the access node and UE may therefore engage in air-interface communication with each other using that lower order MCS.

As further indicated above, suppressing the MCS used for such air-interface communication could help to limit the effective rate of data flow through the backhaul connection, by reducing the effective rate of data flow over the air interface. In particular, with a lower-order MCS that has a lower coding rate (with more error-correction bits added) and/or a modulation scheme in which each resource element represents fewer bits, a given quantity of PRBs would carry less actual data, which may therefore reduce the flow of actual data through the backhaul connection. Use of a lower order MCS on the uplink may therefore help to reduce the flow of data from the access node over the backhaul connection. And use of a lower order MCS on the downlink may likewise help to reduce the flow of data coming to the access node over the backhaul connection.

Furthermore, as noted above, when an access node's backhaul is heavily loaded, in addition to or instead of responsively suppressing the MCS used for air-interface communication on the access node's air interface, it may also be useful to responsively suppress the MCS used for air-interface communication on another access node's air interface. This would be useful in a scenario where the other access node shares the backhaul connection with the access node.

In the arrangement of FIG. 1, for instance, both the 4G eNB 14 and the 5G gNB 16 share use of the CSR 18 for backhaul connection to the core network 20. If the flow of data through the CSR 18 becomes threshold heavy, that could create a backlog problem for both the 4G eNB 14 and the 5G gNB 16. Therefore, if the 4G eNB 14 determines that the backhaul connection is threshold heavily loaded, at CSR port 30 for instance, the 4G eNB 14 might beneficially respond by arranging to suppress the MCS used for air-interface communication on the 5G gNB's air interface. Use of a lower order MCS for communication on the 5G gNB's air interface may help to reduce the rate of data flow through the backhaul connection, which may in turn help reduce the likelihood of problems for the 4G eNB's backhaul communication.

In practice, an access node could determine when its backhaul connection is threshold heavily loaded by monitoring its own data communication on the backhaul connection and/or by receiving from a backhaul node a report related to the backhaul load. At issue here could be a rate of data flow on the backhaul, a rate of packets dropped on the backhaul, and/or one or more other metrics that could indicate a backhaul bottleneck condition.

In the arrangement of FIG. 1, for instance, the 4G eNB's BBU could monitor the rate of its data transmission or reception over its connection with the CSR 18 and could determine when that data rate becomes at least as high as a predefined threshold data rate deemed to be problematic, perhaps a threshold set based on the physical or configured maximum capacity of port 26 of the CSR 18. Alternatively, the 4G eNB's BBU could monitor the rate of packet loss for transmission or reception over its connection with the CSR 18 and could determine when that packet loss rate becomes at least as high as a predefined threshold packet loss rate deemed to be problematic.

Still alternatively, the CSR 18 might monitor the rate of data transmission and/or packet loss for communication through port 30 connecting the CSR 18 with the core network and could determine when that rate becomes at least as high as a predefined threshold rate deemed to be problematic. And when the CSR 18 detects that threshold high rate, the CSR 18 could report that fact to the 4G eNB 14, which the 4G eNB 14 could receive as an indication that the 4G eNB's backhaul connection is threshold heavily loaded. Other examples are possible as well.

In response to detecting that its backhaul connection is threshold heavily loaded, the 4G eNB 14 could then automatically start suppressing the MCS used for communication over the 4G eNB's air interface between the 4G eNB and one or more UE's served by the 4G eNB. For instance, the 4G eNB could responsively switch from a default mode in which the 4G eNB is set to apply a default mapping between UE channel quality and MCS to a suppressed mode in which the 4G eNB is set to instead apply a suppressed mapping between UE channel quality and MCS, as discussed above for instance.

Further, in the arrangement of FIG. 1 where the 5G gNB 16 shares a backhaul connection with the 4G eNB 14, the 4G eNB could also or additionally respond to detecting that the 4G eNB's backhaul connection is threshold heavily loaded by working to cause the 5G gNB 16 to suppress the MCS used for communication over the 5G gNB's air interface. For instance, the 4G eNB 14 could responsively transmit to the 5G gNB 16 a control signal that is interpretable by the 5G gNB 16 to cause the 5G gNB to transition from being set to apply a default mapping between UE channel quality and MCS to being set to instead apply a suppressed mapping between UE channel quality and MCS as discussed above for instance.

In addition, suppressing the MCS used for air interface communication in these or other circumstances could be limited to application for only certain UEs. For example, an access node could responsively suppress MCS just for UEs that thereafter newly connect with the access node, in order to help avoid degrading quality of communication of UEs that are already connected with and being with packet data communications by the access node. And as another example, an access node could responsively suppress MCS just for UEs that the access node determines to be engaged in more or less than a defined threshold extent of data communication, and/or UEs having certain service subscription levels, among other possibilities.

Still further, this suppression of MCS could be temporary. For instance, an access node that switches to a mode of suppressing MCS could automatically revert to its default mode of operation after expiration of a predefined time period. Further or alternatively, an access node that invokes the MCS suppression might thereafter detect that its backhaul load is no longer threshold heavily congested and, in response, might undo the MCS suppression.

Figure 3:
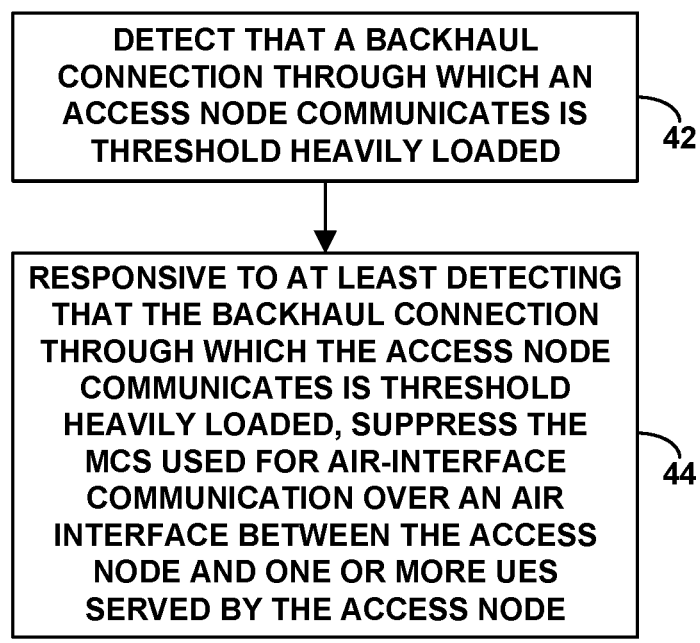
FIG. 3 is a flow chart depicting an example method in accordance with the disclosure.

FIG. 3 is next a flow chart depicting an example method that could be carried out in accordance with the present disclosure, to control MCS used for air-interface communication over an air interface between an access node and one or more UEs served by the access node. This method could be carried out by one of the access nodes in the arrangement of FIG. 1, among other possibilities.

As shown in FIG. 1, at block 42, the method includes detecting that a backhaul connection through which the access node communicates is threshold heavily loaded. And at block 44, the method includes, responsive to at least detecting that the backhaul connection through which the access node communicates is threshold heavily loaded, suppressing the MCS used for air-interface communication over the air interface between the access node and one or more UEs served by the access node.

In line with the discussion above, the access node at issue here could be disposed at a cell site that includes a CSR that provides connectivity between the access node and a core network. And in that case, the act of detecting that the backhaul connection is threshold heavily loaded could involve detecting that backhaul load at the CSR is threshold high. Further, as noted above, detecting that backhaul load at the CSR is threshold high could be based on evaluation of data rate flow through the CSR and/or packet-drop rate for communication through a port of the CSR.

In addition or alternatively, in a scenario where the access node is disposed at a cell site that includes a CSR that provides connectivity between the access node and a core network, the act of detecting that the backhaul connection is threshold heavily loaded could involve detecting that a rate of data flow between the access node and the CSR is threshold high and/or that a rate of packet loss for communication between the access node and the CSR is threshold high.

Further, as discussed above, this method be carried out by the access node at issue, such as by detecting that its backhaul connection is threshold heavily loaded and responsively suppressing MCS used for air-interface communication between it and one or more UEs. Or alternatively, the access node could be a first access node disposed at a cell site together with second access node, and the method could be carried out by the second access node, such as by detecting that the second access node's backhaul connection is threshold heavily loaded and responsively causing the first access node to suppress MCS for communication between the first access node and one or more UEs. Here, for instance, the first access node and second access node might share the backhaul connection.

As additionally discussed above, the access node at issue could have a default mode of operation in which the access node is set to apply a default mapping of UE channel quality to MCS. And in that case, the act of suppressing the MCS used for air-interface communication over the air interface between the access node and one or more UEs served by the access node could involve causing the access node to transition to a suppressed-MCS mode of operation in which the access node is set to instead apply a suppressed mapping of UE channel quality to MCS. For instance, the access node could cause itself to do this, or another access node could cause the access node to do this.

Still further, as discussed above, the act of suppressing the MCS used for air-interface communication over the air interface between the access node and one or more UEs served by the access node could involve capping MCS order at a level lower than a normal maximum. For instance, if the access node has a default table that maps from UE channel quality to MCS and that has a highest listed MCS order, the access node could cap MCS at an order lower than that order.

Alternatively or additionally, the act of suppressing the MCS used for air-interface communication over the air-interface between the access node and a given UE served by the access node could involve causing the air-interface communication to occur with an MCS that is lower order than an MCS to which the access node would normally correlate with channel quality most recently reported by the given UE.

Figure 4:
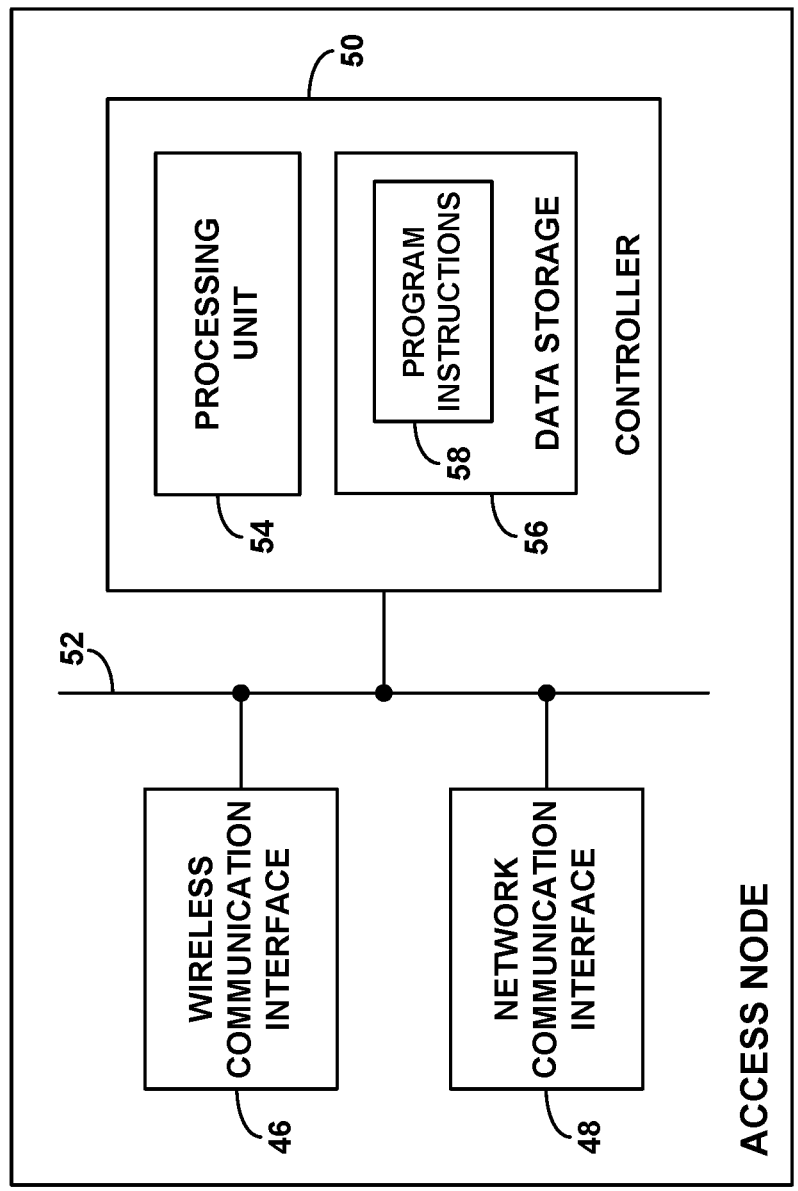
FIG. 4 is a simplified block diagram of an example access node operable in accordance with the disclosure.

FIG. 4 is next a simplified block diagram of an example access node that could operate in accordance with the present disclosure. This access node could be one of those shown in FIG. 1, among other possibilities. As shown, the example access node includes a wireless communication interface 46 a network communication interface 48, and a controller 50, all of which may be communicatively linked together by a system bus, network, or other connection mechanism 52.

In this example access node, the wireless communication interface 46 could comprise an antenna structure, which could be tower mounted or could take other forms, and associated components such as a power amplifier and a wireless transceiver, so as to facilitate providing a coverage area defining an air interface having a downlink and an uplink through which to serve one or more UEs, and engaging in transmission and reception of user-plane data and control-plane signaling over the air interface. And the network communication interface 48 could comprise a wired or wireless interface, such as an Ethernet network communication interface, through which to engage in backhaul communication with other entities.

Further, controller 50 could comprise at least one processing (e.g., one or more general purpose processors and/or specialized processors) 54 programmed to cause the access node to carry out various operations such as those discussed herein. For instance, the controller 50 could comprise at least one non-transitory data storage (e.g., one or more magnetic, optical, or flash storage components) 56 holding program instructions 58 executable by the at least one processing unit 54 to cause the access node to carry out such operations.

Various other features discussed herein can be implemented in this context as well, and vice versa.

In line with the discussion above, the present disclosure also contemplates a wireless communication system configured to control MCS used for air-interface communication. Such a system could include a first access node disposed at a cell site and configured to provide first coverage in which to serve UEs, a second access node disposed at the cell site and configured to provide second coverage in which to serve UEs (e.g., the same or other UEs), and a CSR providing backhaul connectivity between the cell site and a core network. And as discussed above, the first access node could be configured to respond to at least threshold high backhaul load at the CSR by causing the second access node to suppress MCS of air-interface communication that the second access node schedules in the second coverage.

Various other features discussed herein can be implemented in this context as well, and vice versa.

For instance, the first access node could be configured to learn of the threshold high backhaul load at the CSR by receiving from the CSR a report of the threshold high backhaul load, perhaps over a backplane or other signaling interface at an equipment room or cabinet of the cell site.

Further, the act of causing the second access node to suppress MCS of air-interface communication that the second access node schedules in the second coverage could involve transmitting from the first access node to the second access node a control signal to which the second access node is configured to respond by carrying out the suppressing.

Still further, the second access node may have a default mode of operation in which the second access node is set to apply a default mapping of UE channel quality to MCS. And in that case, the act of suppressing the MCS of air-interface communication that the second access schedules in the second coverage could involve causing the second access node to transition to a suppressed-MCS mode of operation in which the second access node is set to instead apply a suppressed mapping of UE channel quality to MCS.

And as discussed above, the act of suppressing the MCS used for air-interface communication over the air interface between the access node and one or more UEs served by the access node could involve capping MCS order at a level lower than a normal maximum and/OR, for a given UE, causing the air-interface communication to occur with an MCS that is lower order than an MCS to which the access node would normally correlate channel quality most recently reported by the given UE.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method to control modulation and coding scheme (MCS) used for air-interface communication over an air interface between an access node and one or more user equipment devices (UEs) served by the access node, the method comprising:
   detecting that a rate of packet loss on a backhaul connection through which the access node communicates is threshold high; and
   responsive to at least detecting that the rate of packet loss on the backhaul connection through which the access node communicates is threshold high, suppressing the MCS used for air-interface communication over the air interface between the access node and one or more UEs served by the access node.

2. The method of claim 1, wherein the access node is disposed at a cell site, wherein the cell site includes a cell site router (CSR) that provides connectivity between the access node and a core network, and wherein detecting that the rate of packet loss on the backhaul connection is threshold high comprises detecting that a rate of packet loss for communication between the access node and the CSR is threshold high.

3. The method of claim 1, wherein the method is carried out by the access node.

4. The method of claim 1, wherein the access node is a first access node, wherein the first access node is disposed at a cell site together with second access node, and wherein the method is carried out by the second access node.

5. The method of claim 4, wherein the first access node and second access node share the backhaul connection.

6. The method of claim 1, wherein the access node has a default mode of operation in which the access node is set to apply a default mapping of UE channel quality to MCS, and wherein suppressing the MCS used for air-interface communication over the air interface between the access node and one or more UEs served by the access node comprises causing the access node to transition to a suppressed-MCS mode of operation in which the access node is set to instead apply a suppressed mapping of UE channel quality to MCS.

7. The method of claim 1, wherein suppressing the MCS used for air-interface communication over the air interface between the access node and one or more UEs served by the access node comprises capping MCS order at a level lower than a normal maximum.

8. The method of claim 1, wherein suppressing the MCS used for air-interface communication over the air-interface between the access node and a given UE served by the access node comprises causing the air-interface communication to occur with an MCS that is lower order than an MCS to which the access node would normally correlate with channel quality most recently reported by the given UE.

9. The method of claim 1, wherein suppressing the MCS used for air-interface communication over the air-interface between the access node and one or more UEs served by the access node is done for just newly connecting UEs.

10. An access node configured to control modulation and coding scheme (MCS) used for air-interface communication over an air interface between the access node and one or more user equipment devices (UEs) served by the access node, the access node comprising:
   a wireless communication interface through serve the one or more UEs;
   a network interface through which to engage in backhaul communication; and
   a controller, wherein the controller is configured to cause the access node to carry out operations when the access node is serving the one or more UEs, the operations including:
      detecting that a rate of packet loss on a backhaul connection through which the access node engages in the backhaul communication is threshold high, and
      responsive to at least detecting that the rate of packet loss on the backhaul connection through which the access node engages in the backhaul communication is threshold high, suppressing the MCS used for air-interface communication over the air interface between the access node and the one or more UEs.

11. The access node of claim 10, wherein the controller comprises at least one processing unit, at least one non-transitory data storage, and program instructions stored in the at least one non-transitory data storage and executable by the at least one processing unit to cause the access node to carry out the operations.

12. A wireless communication system configured to control modulation and coding scheme (MCS) used for air-interface communication, the wireless communication system comprising:

a first access node disposed at a cell site and configured to provide first coverage in which to serve user equipment devices (UEs);

a second access node disposed at the cell site and configured to provide second coverage in which to serve UEs; and a cell site router (CSR) providing backhaul connectivity between the cell site and a core network, wherein the first access node is configured to respond to at least threshold high backhaul load at the CSR by causing the second access node to suppress MCS of air-interface communication that the second access node schedules in the second coverage.

13. The wireless communication system of claim 12, wherein the first access node is further configured to learn of the threshold high backhaul load at the CSR by receiving from the CSR a report of the threshold high backhaul load.

14. The wireless communication system of claim 12, wherein causing the second access node to suppress MCS of air-interface communication that the second access node schedules in the second coverage comprises transmitting from the first access node to the second access node a control signal to which the second access node is configured to respond by carrying out the suppressing.

15. The wireless communication system of claim 12, wherein the second access node has a default mode of operation in which the second access node is set to apply a default mapping of UE channel quality to MCS, and wherein suppressing the MCS of air-interface communication that the second access schedules in the second coverage comprises causing the second access node to transition to a suppressed-MCS mode of operation in which the second access node is set to instead apply a suppressed mapping of UE channel quality to MCS.

16. The wireless communication system of claim 12, wherein suppressing the MCS used for air-interface communication over the air interface between the access node and one or more UEs served by the access node comprises capping MCS order at a level lower than a normal maximum.

17. The wireless communication system of claim 12, wherein suppressing the MCS used for air-interface communication over the air interface between the access node and a given UE served by the access node comprises causing the air-interface communication to occur with an MCS that is lower order than an MCS to which the access node would normally correlate channel quality most recently reported by the given UE.

* * * * *